United States Patent

Cordioli

Patent Number: 5,615,581
Date of Patent: Apr. 1, 1997

[54] REMOTELY CONTROLLED DEVICE FOR ROTATING THE STEERING-WHEEL OF A MOTOR VEHICLE AND THEN TAKING IT BACK TO THE STARTING POSITION

[76] Inventor: Sergio Cordioli, Via Salmeggia, 10, Milan, Italy

[21] Appl. No.: 513,814
[22] PCT Filed: Mar. 3, 1994
[86] PCT No.: PCT/IT94/00018
§ 371 Date: Sep. 1, 1995
§ 102(e) Date: Sep. 1, 1995
[87] PCT Pub. No.: WO94/20340
PCT Pub. Date: Sep. 15, 1994

[30] Foreign Application Priority Data

Mar. 5, 1993 [IT] Italy ................... MI93A0428

[51] Int. Cl.⁶ .................. B60S 5/00; B62D 1/22
[52] U.S. Cl. .................. 74/494; 74/110; 74/495; 33/203
[58] Field of Search ............. 74/494, 495, 110; 73/118.1; 33/1 N, 203, 203.18, 335

[56] References Cited

U.S. PATENT DOCUMENTS

| | | | |
|---|---|---|---|
| 2,531,675 | 11/1950 | Field | 74/495 |
| 3,003,363 | 10/1961 | De Hart | 74/494 |
| 3,762,239 | 10/1973 | Rouis | 74/494 |
| 3,889,527 | 6/1975 | Wallace | 73/118.1 |
| 3,895,545 | 7/1975 | Hunter | 74/494 |

FOREIGN PATENT DOCUMENTS 386439  9/1990  European Pat. Off. ............ 33/203.18

Primary Examiner—Charles A. Marmor
Assistant Examiner—Troy Grabow
Attorney, Agent, or Firm—Dvorak and Traub

[57] ABSTRACT

A remotely controlled device for rotating the steering-wheel of a vehicle consists of an upper portion for gripping the steering-wheel ring by means of jaws (1), of a central frame (14) carrying a motor (16) with the relevant motion transmission chain (10, 11, 12, 13, 15) and means for detecting and memorizing the rotations (17, 19, 22, 23, 24), and of a lower portion with supporting members (27, 28, 29, 30, 31) which provide the device with the base required to react to the steering-wheel reaction torque.

2 Claims, 3 Drawing Sheets

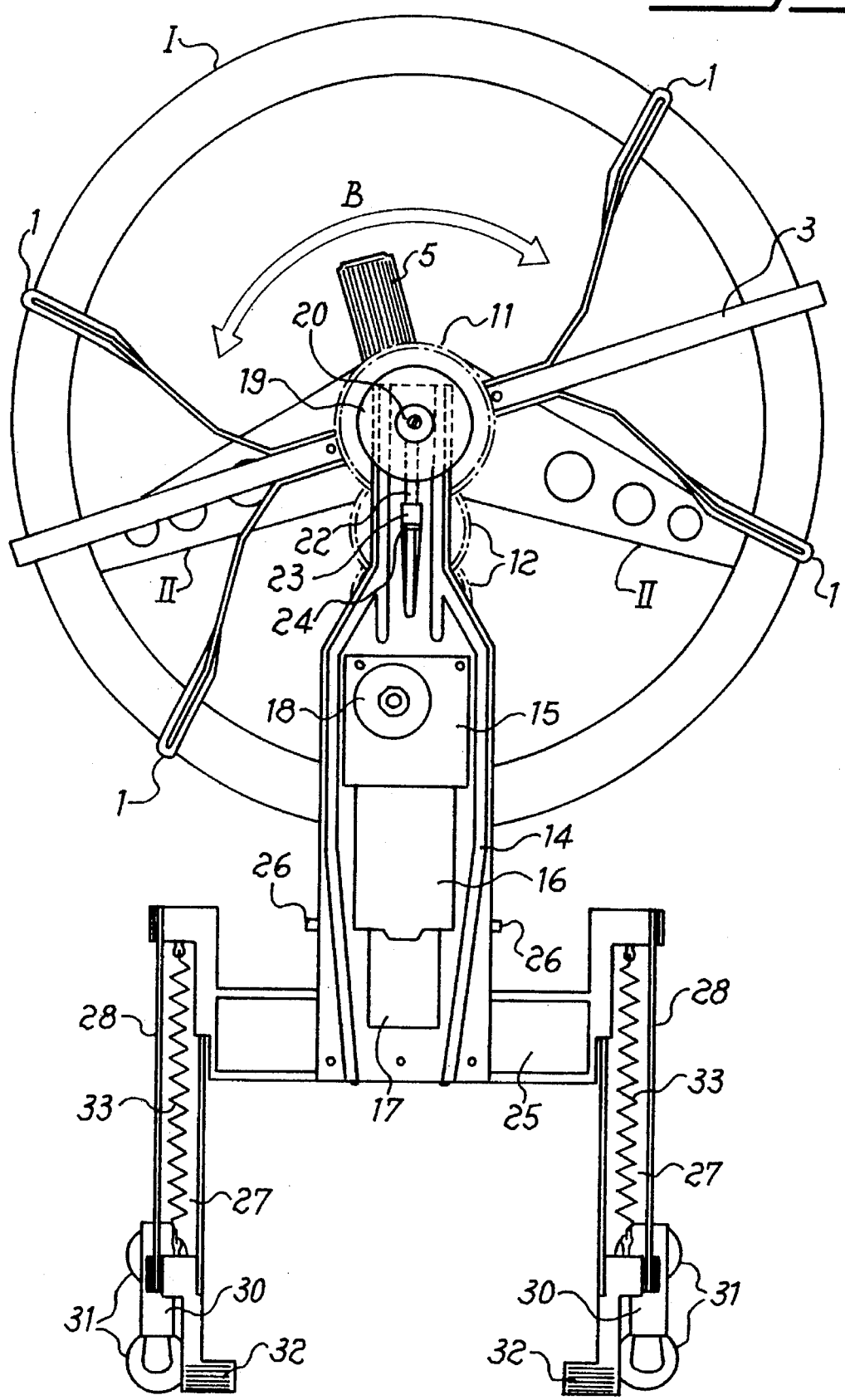

5,615,581

REMOTELY CONTROLLED DEVICE FOR ROTATING THE STEERING-WHEEL OF A MOTOR VEHICLE AND THEN TAKING IT BACK TO THE STARTING POSITION

BACKGROUND OF THE INVENTION

1. Field of the Invention

The present invention concerns devices for analysing end tuning motor vehicles, and in particular a remotely controlled device for rotating the steering-wheel and then taking it back to the starting position.

It is known that the front steering wheels of motor vehicles require a periodical check and truing operation of their toe-in in order to verify the correctness of the various angles characterizing the forecarriage kinematic mechanism. In carrying out said toe-in operation, the front wheels are repeatedly steered one way and the other by means of the steering-wheel, in order to allow also the alignment of the steering-wheel spiders with the wheels, so that the driver is not obliged, to keep the steering-wheel lightly rotated on one side to go straight.

This rotation of the steering-wheel is usually carried out manually by the person carrying out the toe-in operation, which blocks the steering-wheel in the desired position by means of a suitable device, or by an assistant thereof whim rotates and blocks the steering-wheel according to the instructions of the operator which is under the vehicle,

2. The Prior Art

An example of a remotely controlled apparatus capable of rotating the steering wheel of an automobile is disclosed in U.S. Pat. No. 3,465,577. However, this apparatus is mainly intended to manipulate the control pedals and the gear shift lever, while having the optional capability of rotating the steering wheel by means of a pair of rollers having a soft surface to contact the steering wheel ring. It is apparent that this arrangement does not prevent the rollers from sliding on the ring, particularly at the end of the steering run. Moreover, it can not be applied to steering wheels having a shape other than exactly circular (e.g. oval or rounded square), otherwise the rollers would not contact the ring properly along certain arcs of the rotation.

SUMMARY OF THE INVENTION

The object of the present invention is to provide a remotely controlled device overcoming the above-cited drawbacks of the prier art and suitable to replace properly the operator's assistant, so that the operator himself can carry out precise steering-wheel adjustments with no need to move from his working position.

A further object of the captioned device is taking back the steering-wheel exactly to the starting position at the end of the operation.

These objects are achieved by means of a device consisting of an upper portion for gripping the steering-wheel ring by means of jaws, a central frame carrying a motor, together with means for transmitting the motion of the motor, and means for detecting and memorizing the rotations of the steering-wheel, and a lower portion with supporting members which provide the device with the base required to react to the steering-wheel reaction torque.

Therefore, the device according to the present invention allows to carry out a very fine and precise adjustment of the steering-wheel movement, absolutely impossible to be achieved manually or with prior art devices, so that the truing of the wheel toe-in can be carried out with great precision.

Another advantage of the captioned device is its capacity of memorizing the steering-wheel starting position and the following rotations thereof, so that it is capable of automatically taking back the steering-wheel exactly to said position at the end of the operation.

BRIEF DESCRIPTION OF THE DRAWINGS

These and other advantages end characteristics of the device according to the present invention will be apparent from the following detailed description of a preferred embodiment thereof, reported as a non-limiting example, referring to the annexed drawings wherein:

FIG. 3 is a front view of the device mounted on a steering-wheel and with the lower portion in the retracted position.

DETAILED DESCRIPTION OF THE INVENTION

Figure 1:
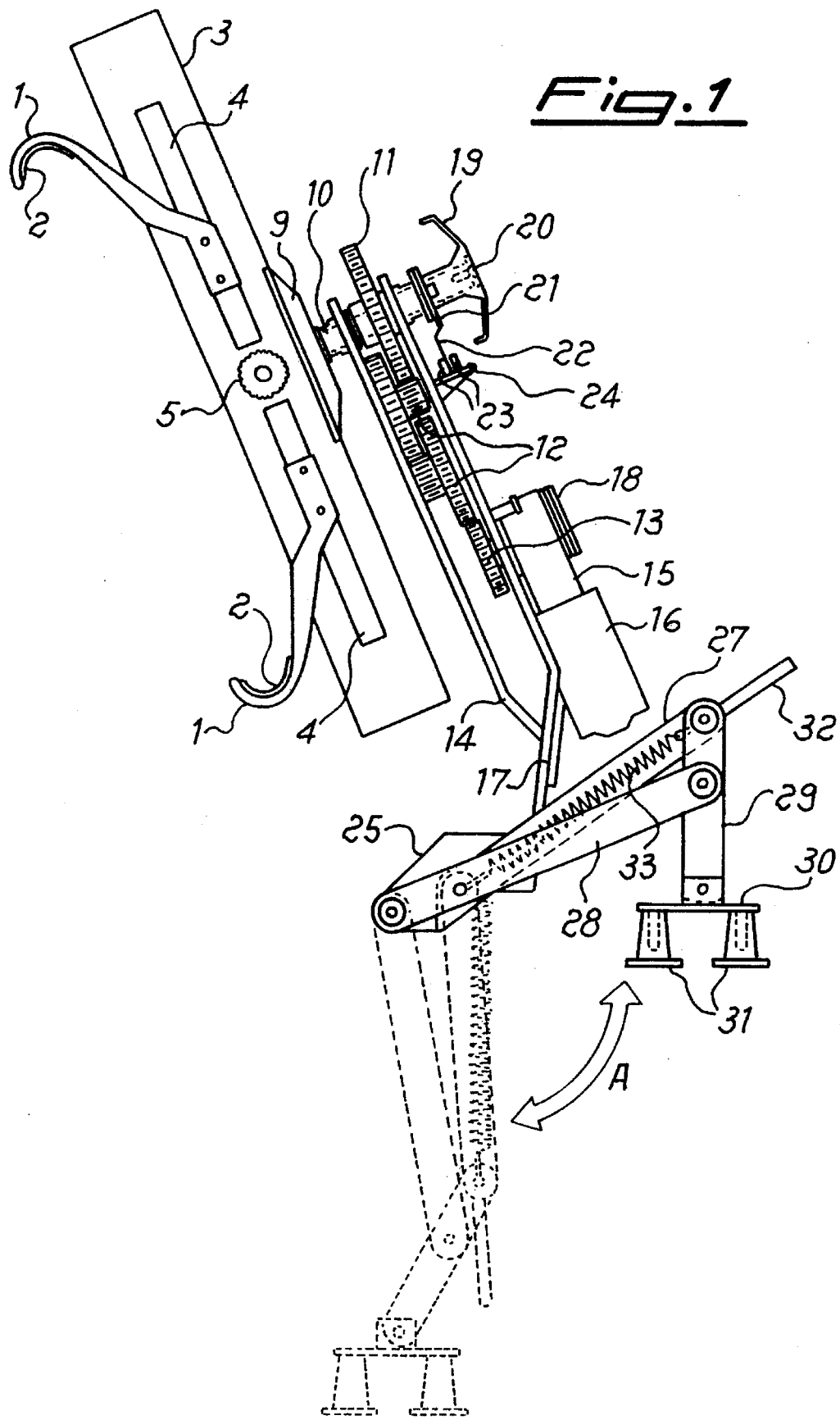
FIG. 1 is a partly see-through view of the captioned device, wherein the movement of the lower portion is indicated by the dotted lines.

Referring to FIG. 1, there is seen that the captioned device is made up by an upper portion for gripping the steering-wheel, a central frame carrying the driving and memory apparatus and a lower supporting portion.

Figure 2:
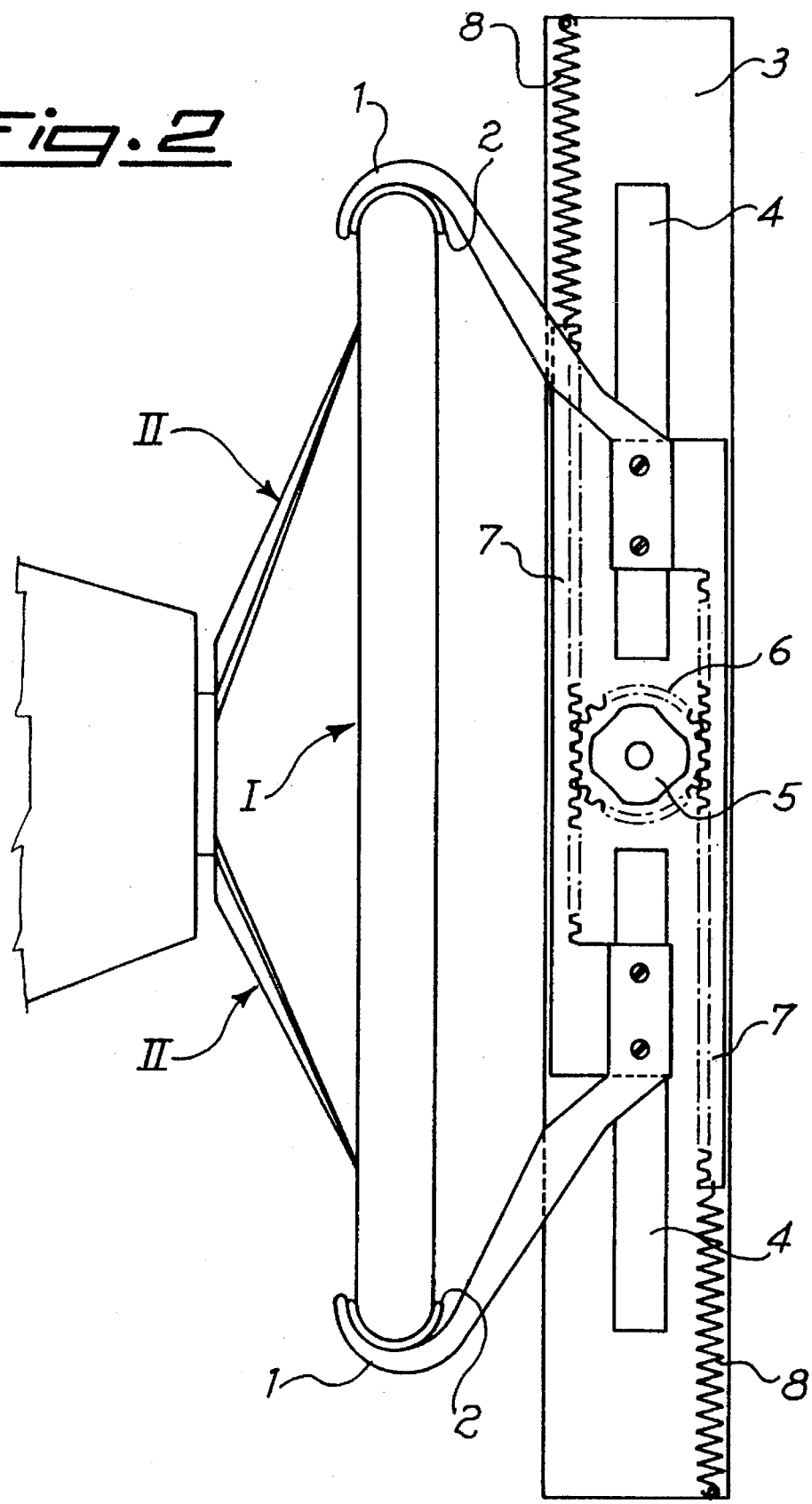
FIG. 2 is a see-through view of the upper portion of the device mounted on steering-wheel; end

Referring to FIG. 2, there is shown that the ring 1 of the steering-wheel is gripped by means of jaws 1 substantially hook-shaped and internally provided with a coating 2 suitable to avoid that sead jaws 1 slip on said ring 1 and/or scratch it. In the described embodiment, there are four jaws 1 (FIG. 3) made of flexible steel, however they could be different in number, position and material, as far as they continue to carry out their gripping function on the steering-wheel.

Jaws 1 slide on an arm 3 wherein two longitudinal guides 4 are formed, and the opening and closing motion of said jaws 1 is controlled by a knob 5 which is coaxially integral with a gear 6 which engages two rack members 7, each of which carries at one end thereof the respective jaws 1. To maintain the pressure of the latter on the ring 1 of the steering-wheel, each of the members 7 is connected, at the end opposite to that of jaws 1, to an end of arm 3 through a spring 8 which exerts a traction such as to keep jaws 1 tightly gripping, and whose force must be overcome by means of knob 5 in order to remove the device from the steering-wheel.

Turning back to FIG. 1, there is seen that arm 3 is connected to the rest of the device through a plate 9 which is driven into rotation by a shaft 10 integral thereto which takes the motion from a gear 11 keyed thereon and driven in turn by gears 12 for reducing and transmitting the motion coming from a driving gear 13. This series of gears is mounted within a central frame 14, outside which, on the lower portion thereof, a reducer 15 which operates gear 13, an electric motor 16 and a processor 17 controlling the operation of the device are mounted. For safety purposes, reducer 15 includes an adjustable clutch 18 which disengages motor 16 in case the device meets with an excessive resistance against the rotation of the steering-wheel, so as to prevent possible damages to the device itself and/or to the steering kinematic chain. The present device further includes the means for the remote control which, in the illustrated embodiment, consist of a radio receiver (not shown) picking up the pulses of a radio control, but they might as well consist, in particular cases of interferences, of a wire control.

On the upper portion of frame 14, on the outside thereof, there is mounted a knob 19 coaxial with shaft 10 and provided with an internal clutch 20 suitable to disengage said knob 19 from said shaft 10; between the end of shaft 10 and knob 19 there is interposed a disc 21, integral with the latter, provided with a tongue 22 which, upon rotation of said disc 21, passes between two photocells 23 positioned below shaft 10 and connected to processor 17 which thus detects the passage of tongue 22, said passage being also indicated by the switching on of an indicator light 24 located in front of said photocells 23.

Referring now also to FIG. 3, there is seen that frame 14 is connected at the bottom to the device portion which provides the support to react to the steering-wheel rotation torque.

A central structure 25, centered with respect to frame 14, contains a battery, for operating motor 16, which is charged through proper electrodes 26 outside the battery container; the ends of two rods are pivoted on each side of structure 25, a main rod 27 in a more advanced position and a secondary rod 28 in a more receded position towards the steering-wheel, both of them being pivoted at the other end on a support rod 29 which is provided at the bottom with a support plane 30, also pivoted on said rod 29 and provided with a pair of feet 31.

For the manual operation of the supporting members, the main rod 27 extends forward into a lever 32 integral therewith, and it is provided with an external spring 33 suitable to retain the supporting structure in the bent position upwards and subsequently, once in the downwards rotation indicated by arrow A the return point has been surpassed, to exert a pressure on the support rod 29 to achieve the self-adjustment of the support plane 30.

The operation of the device according to the present invention is now illustrated, in particular with reference to the starting position memorization function.

As already mentioned in the description of the device, the installation on ring 1 of the steering-wheel is carried out through jaws 1 which are opened and then closed by means of knob 5, the steering-wheel being in any position; once jaws 1 have been properly tightened, the lower support structure is lowered, with the aid of springs 33, by pushing on levers 32 so that feet 31 lean on a reaction plane which, for example, is the seat bottom or the vehicle floor, and whose inclination with respect to the device is compensated by the self-orientation of the supporting planes 30 which are pivoted on rods 29. In case of leaning on a sinking surface such as the seat bottom, the presence of springs 33 allows to lower feet 31 until the plane reacts with a force equal to that of spring 33, thus avoiding sensible settling in the first phases of the steering-wheel rotation.

Having thus provided the device with the base required to react to the steering-wheel reaction torque, the operator carries out the centering of the steering-wheel by operating motor 16, through the remote control, which puts into rotation arm 3 as indicated by arrow B, until he visually finds the alignment of spiders II of the steering-wheel. Once the steering-wheel is exactly centered on the vertical, the operator disengages knob 19 from shaft 10 by means of clutch 20 and rotates said knob 19, carrying along disc 21, until he detects, by means of indicator 24, the alignment of tongue 22 with photocells 23; then he engages again knob 19 on shaft 10 and resets the rotation count carried out by processor 17, which, from now on, provides the memorization of the direction and number of the passages of tongue 22 through photocells 23.

After having carried out the setting operation of the present device, the operator can go below the vehicle to proceed to the forecarriage truing operation, with no further need to climb up to rotate the steering-wheel since the remote control allows him to carry out the steering of the wheels in the direction and for the angle required, with the possibility, for example by means of two different pushbuttons, of a fine or rough adjustment of the steering angle.

At the end of the truing, the operator sends the steering-wheel realignment command to processor 17, which said processor 17 carries out by taking into account the steering-wheel position as it results from the rotations it has memorized; in order to divide equally between the two directions of rotation the unavoidable mechanical plays present in the kinematic chain, the device does not immediately stop the steering-wheel at the starting position, but surpasses it and then comes back surpassing it in the opposite direction and so on, with an oscillation of decreasing amplitude around said starting position. Therefore, it is apparent that the device according to the present invention fully achieves the intended object of replacing the additional labour presently required, with the further advantage of a precision of rotation and of return to the starting position impossible to be manually achieved.

All the members of the above-described embodiment may of course be replaced by equivalents thereof, for example a different system for detecting and memorizing the rotations, a different motion transmission chain, a different kind of motor, and so on.

I claim:

1. A remotely controlled device for rotating the steering-wheel of a motor vehicle and then taking it back to the starting position, comprising;

an upper portion for rotating the steering-wheel having a plurality of substantially hook-shaped jaws for securely gripping the steering-wheel ring the upper portion being integrally mounted at the output of means for transmitting a rotation motion transmitted by a motor, said transmitting means being connected through a central frame to a lower self-adjusting support portion suitable to provide a base required to react to the steering-wheel reaction torque, said lower support portion further comprising means for detecting the rotations of the steering-wheel means for remotely controlling the device, and means for memorizing the rotations of the steering-wheel, and wherein the hook-shaped jaws are slidably mounted on an arm wherein two guides are longitudinally formed, a closing and opening movement of the jaws being controlled by a knob to which a gear engaging two rack members is coaxially integral, the jaws being mounted on an end of the rack members, each of the rack members being connected, at an end opposite to that of the jaws, to an end of the arm through a spring which exerts a traction such as to keep the jaws tightly closed.

2. The device according to claim 1, wherein the motor is an electric motor and the means for transmitting the rotation motion of the motor comprises a shaft having a gear keyed thereon and operated by gears connected to a reducer located at the output of said motor, and wherein the means for detecting and memorizing the rotations comprises a knob coaxial with said shaft and provided with an internal disengage said knob from the shaft, a disc, interposed between the end of the shaft and the knob and integral with the knob, provided with a tongue which passes between two photocells upon rotation of said disc, a processor connected to said photocells, and an indicator light which shows the passage of said tongue between photocells.

* * * * *